United States Patent
Lista et al.

(10) Patent No.: US 10,730,996 B2
(45) Date of Patent: Aug. 4, 2020

(54) TOLUENE DIISOCYANATE BIURET BASED PREPOLYMERS FOR POLYURETHANE FOAMS

(71) Applicant: Dow Global Technologies LLC, Midland, MI (US)

(72) Inventors: Giuseppe Lista, Correggio (IT); Alessandra Mosca, Milan (IT)

(73) Assignee: Dow Global Technologies LLC, Midland, MI (US)

( * ) Notice: Subject to any disclaimer, the term of this patent is extended or adjusted under 35 U.S.C. 154(b) by 124 days.

(21) Appl. No.: 15/762,208

(22) PCT Filed: Jun. 27, 2016

(86) PCT No.: PCT/US2016/039536
§ 371 (c)(1),
(2) Date: Mar. 22, 2018

(87) PCT Pub. No.: WO2017/058318
PCT Pub. Date: Apr. 6, 2017

(65) Prior Publication Data
US 2018/0258216 A1 Sep. 13, 2018

(30) Foreign Application Priority Data
Sep. 29, 2015 (IT) .................. 102015000056417

(51) Int. Cl.
| C08G 18/08 | (2006.01) |
|---|---|
| C08G 18/12 | (2006.01) |
| C08G 18/40 | (2006.01) |
| C08G 18/42 | (2006.01) |
| C08G 18/48 | (2006.01) |
| C08G 18/72 | (2006.01) |
| C08G 18/76 | (2006.01) |
| C08G 18/78 | (2006.01) |
| C08J 9/00 | (2006.01) |
| C08K 5/1565 | (2006.01) |
| C08G 101/00 | (2006.01) |

(52) U.S. Cl.
CPC ......... *C08G 18/7831* (2013.01); *C08G 18/12* (2013.01); *C08G 18/14* (2013.01); *C08G 18/4018* (2013.01); *C08G 18/42* (2013.01); *C08G 18/4804* (2013.01); *C08G 18/4808* (2013.01); *C08G 18/725* (2013.01); *C08G 18/7664* (2013.01); *C08J 9/0023* (2013.01); *C08G 2101/00* (2013.01); *C08J 2375/08* (2013.01); *C08K 5/1565* (2013.01)

(58) Field of Classification Search
CPC .... C08G 18/12; C08G 18/14; C08G 18/4018; C08G 18/42; C08G 18/4804; C08G 18/4808; C08G 18/725; C08G 18/7664; C08G 18/7831; C08J 2375/08; C08J 9/0023; C08K 5/1565
See application file for complete search history.

(56) References Cited

U.S. PATENT DOCUMENTS

| 3,455,886 A | 7/1969 | Versnel |
|---|---|---|
| 3,933,725 A | 1/1976 | Dearlove et al. |
| 4,394,491 A | 7/1983 | Hoffman |
| 4,481,309 A | 11/1984 | Straehle et al. |
| 4,902,816 A | 2/1990 | McDaniel |
| 5,770,635 A | 6/1998 | Lee et al. |
| 5,925,781 A | 7/1999 | Pantone et al. |
| 6,174,984 B1 | 1/2001 | Peter |
| 6,552,097 B1 | 4/2003 | Pauls et al. |
| 6,569,352 B1 | 5/2003 | Hillshafer et al. |
| 7,943,679 B2 | 5/2011 | De Vos et al. |
| 8,318,826 B2 | 11/2012 | Morley et al. |

(Continued)

FOREIGN PATENT DOCUMENTS

| DE | 214847 | 10/1984 |
|---|---|---|
| DE | 4025843 A1 | 2/1992 |

(Continued)

OTHER PUBLICATIONS

Machine translation of EP 2272883 obtained from the European Patent Office in Sep. 2019.*
International Preliminary Report on Patentability pertaining to PCT/US2016/039536 dated Apr. 12, 2018.
International Search Report and Written Opinion pertaining to PCT/US2016/039536 dated Sep. 23, 2016.
International Preliminary Report on Patentability pertaining to PCT/US2016/052478 dated Apr. 3, 2018.
International Search Report and Written Opinion pertaining to PCT/US2016/052478 dated Sep. 9, 2016.

(Continued)

*Primary Examiner* — Melissa A Rioja
(74) *Attorney, Agent, or Firm* — Dinsmore & Shohl LLP

(57) ABSTRACT

Polyurethane foams including a polyurethane prepolymer composition, a catalyst, and a propellant are provided. The polyurethane prepolymer composition is produced from a formulation that includes an isocyanate reactive component in an amount of from about 1% to about 70% by weight based on the polyurethane prepolymer composition and an isocyanate component in an amount of from about 1% to about 70% by weight based on the polyurethane prepolymer composition. The isocyanate component includes toluene diisocyanate biuret in an amount of from about 1 to about 100% by weight based on the isocyanate component. The isocyanate reactive component includes one or more polyols. The polyurethane prepolymer composition has a viscosity of less than about 10,000 mPa*s at 50° C. and is substantially free of monofunctional reactive components. The polyurethane prepolymer composition also includes a free isocyanate monomer content of the toluene diisocyanate biuret of less than about 1% by weight.

8 Claims, No Drawings

(56) References Cited

U.S. PATENT DOCUMENTS

| | | | |
|---|---|---|---|
| 8,592,497 B2 | 11/2013 | Reese et al. | |
| 8,680,211 B2 | 3/2014 | Shutov et al. | |
| 2005/0020765 A1 | 1/2005 | Slack et al. | |
| 2005/0043423 A1* | 2/2005 | Schmidt | C08G 18/482 521/155 |
| 2005/0234144 A1 | 10/2005 | Bachon et al. | |
| 2008/0207791 A1 | 8/2008 | Klesczewski et al. | |
| 2012/0225225 A1 | 9/2012 | Franken et al. | |
| 2012/0289619 A1* | 11/2012 | Battistini | C08G 18/4072 521/125 |
| 2014/0179813 A1 | 6/2014 | Kinzelmann et al. | |
| 2014/0206786 A1* | 7/2014 | Xu | C08G 18/546 521/173 |
| 2014/0213677 A1 | 7/2014 | Jimenez et al. | |
| 2014/0309323 A1 | 10/2014 | Verstegen et al. | |
| 2015/0025164 A1 | 1/2015 | Golini et al. | |
| 2015/0031815 A1 | 1/2015 | Singh et al. | |
| 2015/0191577 A1 | 7/2015 | Kisin et al. | |

FOREIGN PATENT DOCUMENTS

| | | |
|---|---|---|
| DE | 10311607 A1 | 3/2003 |
| EP | 0909772 A1 | 4/1999 |
| EP | 2272883 A1 | 1/2011 |
| EP | 2706074 A1 | 3/2014 |
| EP | 2563830 B1 | 9/2014 |
| JP | 2014530282 A | 11/2014 |
| WO | WO02079291 A1 | 10/2002 |
| WO | WO2011036018 A1 | 3/2011 |
| WO | WO2011137011 A1 | 11/2011 |
| WO | WO2013053555 A2 | 4/2013 |
| WO | WO2014020439 A2 | 2/2014 |
| WO | WO2014123434 A1 | 8/2014 |
| WO | WO2015143260 A1 | 9/2015 |
| WO | WO2017058318 A1 | 4/2017 |
| WO | WO2017058550 A1 | 4/2017 |

OTHER PUBLICATIONS

Office Action/International Search Report and Written Opinion pertaining to Italian Patent Application No. 102015000056417 dated Mar. 31, 2016.

Office Action/International Search Report and Written Opinion pertaining to Italian Patent Application No. 102015000056417 dated Sep. 6, 2016.

Office Action dated Oct. 9, 2019 pertaining to U.S. Appl. No. 15/762,208, filed Mar. 22, 2018, 23 pgs.

Office Action dated May 12, 2020 pertaining to Chinese Patent Application No. 201680052725, filed Jun. 27, 2016.

* cited by examiner

TOLUENE DIISOCYANATE BIURET BASED PREPOLYMERS FOR POLYURETHANE FOAMS

CROSS-REFERENCE TO RELATED APPLICATIONS

This application claims priority to Italian Patent Application No. 102015000056417, filed Sep. 29, 2015, the contents of which is hereby incorporated by reference in its entirety.

TECHNICAL FIELD

Embodiments of the present disclosure are generally related to prepolymers for polyurethane foams, and are specifically related to prepolymers for polyurethane foams comprising toluene diisocyanate (TDI) biuret.

BACKGROUND

Polyurethane foams are widely used in a variety of applications. For some applications, the polyurethane foam is sold in the form of a spray foam which can be used for various do-it-yourself applications, such as for sealing and insulation.

However, various environmental, health, and safety organizations require special labeling of polyurethane foams that include an isocyanate monomer level of greater than 1% by weight for at least one of its isocyanate components. In order to avoid this labeling requirement, some methods of forming the polyurethane prepolymer include a step of removing excess isocyanate monomer after reacting diisocyanate with a polyol. However, this additional processing can be time-consuming and costly. Accordingly, there is a need for polyurethane foam prepolymers that include low isocyanate monomer content without a separation step.

SUMMARY

Embodiments of the present disclosure are directed to polyurethane prepolymers having low isocyanate monomer content and polyurethane foams produced from the polyurethane prepolymers. The polyurethane prepolymers are precursors of polyurethane foams produced from the reaction of isocyanates including TDI biuret and isocyanate reacting mixtures comprising polyols. Moreover, the polyurethane prepolymer may have a viscosity of less than about 10,000 mPa*s at 50° C. and a free isocyanate monomer content of the toluene diisocyanate biuret of less than about 1% by weight.

According to one embodiment, a polyurethane prepolymer is provided. The polyurethane prepolymer comprises an isocyanate reactive component in an amount of from about 1% to about 70% by weight based on the polyurethane prepolymer and an isocyanate component in an amount of from about 1% to about 70% by weight based on the polyurethane prepolymer. The isocyanate component includes TDI biuret in an amount of from about 1 to about 100% by weight based on the isocyanate component. The isocyanate reactive component includes one or more polyols. The polyurethane prepolymer has a viscosity of less than about 10,000 mPa*s at 50° C. and is substantially free of monofunctional reactive components. The polyurethane prepolymer also includes a free isocyanate monomer content of the TDI biuret of less than about 1% by weight.

According to another embodiment, a polyurethane foam is provided. The polyurethane foam includes from about 40% to about 70% by weight of a polyurethane prepolymer, from about 20% to about 40% by weight of a propellant, and from about 1% to about 5% by weight of a catalyst. The polyurethane prepolymer includes an isocyanate reactive component in an amount of from about 1% to about 70% by weight based on the polyurethane prepolymer and an isocyanate component in an amount of from about 1% to about 70% by weight based on the polyurethane prepolymer. The isocyanate component includes TDI biuret in an amount of from about 1 to about 100% by weight based on the isocyanate component. The isocyanate reactive component includes one or more polyols. The polyurethane prepolymer has a viscosity of less than about 10,000 mPa*s at 50° C. and is substantially free of monofunctional reactive components. The polyurethane prepolymer also includes a free isocyanate monomer content of the TDI biuret of less than about 1% by weight.

DETAILED DESCRIPTION

In various embodiments, a formulation for producing polyurethane foam is provided. The formulation may include a polyurethane prepolymer, a propellant, and a catalyst. According to one or more embodiments, the polyurethane prepolymer includes an isocyanate component and an isocyanate reactive component that includes polyols that react with the isocyanate component. The isocyanate component includes TDI biuret in an amount of from about 1 to about 100% by weight based on the isocyanate component. The resultant polyurethane prepolymer has a viscosity of less than about 10,000 mPa*s at 50° C. and is substantially free of monofunctional reactive components. The polyurethane prepolymer also includes a free isocyanate monomer content of the TDI biuret (TDI %) of less than about 1% by weight.

In further embodiments, the isocyanate component may include at least one additional isocyanate. This additional isocyanate may include, for example, a methylene diphenyl diisocyanate (MDI). In such embodiments, the polyurethane prepolymer includes a free isocyanate monomer content of each additional isocyanate of less than about 1% by weight. In specific embodiments wherein MDI is included, the free isocyanate monomer content of the MDI (MDI %) is less than about 1% by weight. Various embodiments of the isocyanate component include from about 1% to about 70% by weight of the polyurethane prepolymer, or from 10% to about 60% by weight of the polyurethane prepolymer, or from 15% to about 50% by weight of the polyurethane prepolymer, or from 18% to about 30% by weight of the polyurethane prepolymer.

As described above, the isocyanate component comprises TDI biuret. The TDI biuret compound may encompass one or more of the TDI isomers, such as 2,4-TDI and 2,6-TDI. Moreover, the biuret group of the TDI biuret, which is also called carbamylurea, may be produced by reacting a urea with the isocyanates of the TDI to yield biuret linkages. Various embodiments include toluene diisocyanate (TDI) biuret in an amount of from about 1% to about 100%, from about 50% to about 100%, or from about 60% to about 80% by weight based on the isocyanate component. In specific embodiments, a mixture of about 60% pure TDI 80 and 40% polymer of a TDI oligomeric mixture may be employed having an equivalent weight of approximately 105 g/mol. One example of a suitable commercially available TDI biuret is VORALUX™ HE1000 from The Dow Chemical Company (Midland, Mich.).

Further as stated above, in addition to the TDI biuret, additional isocyanates may also be included in the isocyanate component of the prepolymer. Suitable isocyanates may include polyisocyanates, including, but not limited to, aliphatic, cycloaliphatic, aryliphatic and aromatic polyisocyanates. Examples of suitable isocyanates may also include alkylene diisocyanates having from 4 to 12 carbon atoms in the alkylene moiety such as 1,12 dodecane diisocyanate; 2-methylpentamethylene 1,5-diisocyanate; tetramethylene 1,4-diisocyanate; hexamethylene 1,6-diisocyanate; cyclohexane 1,3- and 1,4-diisocyanate; 1-isocyanato-3,3,5-triemethyl-5-isocyanatomethylcyclohexane (isophorone diisocyanate), 2,4- and 2,6-hexahydrotoluene diisocyanate and the corresponding isomer mixtures; 4,4'-, 2,2'- and 2,4' dicyclohexylmethane diisocyanate and the corresponding isomer mixtures; 2,4- and 2,6-toluene diisocyanate and the corresponding isomer mixtures; 4,4'-, 2,4'- and 2,2'-diphenylmethane diisocyanates; polymethylene polyphenyl isocyanates; mixtures of 4,4', 2,4'- and 2,2' diphenylmethane diisocyanates and polymethylene polyphenyl isocyanates (PMDI); and mixtures of PMDI and TDIs. In general, the additional isocyanate component has an average functionality of at least about 2.5 or from about 2.5 to about 3.3. In some embodiments, the isocyanate component may include one or more diisocyanates or polyisocyanates. The polyisocyanate may be a polymeric MDI product having an average isocyanate functionality of from 2.6 to 3.3 isocyanate groups/molecule and an isocyanate equivalent weight of from 130 to 170. Suitable commercially available products include PAPI 27, VORANATE™ M229, VORANATE™ 220, VORANATE™ 290, VORANATE™ M595 and VORANATE™ M600, all from The Dow Chemical Company (Midland, Mich.). In one particular embodiment, an MDI isocyanate is present in an amount of from about 2% to about 20%, from about 5% to about 15% or from about 8% to about 12% by weight based on the isocyanate component.

In various embodiments, the isocyanate component, whether the TDI biuret or an additional isocyanate component, has an equivalent weight between 100 g/mol and 175 g/mol, or an equivalent weight between 130 g/mol and 140 g/mol. As used herein, the equivalent weight is the weight of a compound per reactive site and is equal to the molecular weight divided by the functionality. The isocyanate component may have a viscosity of from about 0.1 Pa*s to about 1.5 Pa*s in various embodiments, although in some embodiments, the viscosity of the isocyanate component is from about 0.2 Pa*s to about 0.7 Pa*s at 25° C.

The polyurethane prepolymer also includes an isocyanate reactive component in an amount of from about 1% to about 70% or from about 30% to about 70% by weight based on the polyurethane prepolymer. Various embodiments are substantially free of monofunctional reactive components. Monofunctional reactive components may include, by way of example and not limitation, monohydroxyl alcohols, and may be chain terminators when reacted with the isocyanate component.

The isocyanate reactive component includes one or more polyols that react with the isocyanate component, although in some embodiments, amino compounds may also be included in the isocyanate reactive component. Polyols suitable for preparing the prepolymer include polyether polyols, polyester polyols, or combinations thereof. In various embodiments, all of the polyol molecules can be the same or they can be a blend of more than one type of polyols. For example, embodiments may include mixtures of one or more polyester polyols and one or more polyether polyols.

The polyols may contain amine groups in some embodiments. The number average molecular weight of the polyols may be between 100 and 12,000 grams per mole. The polyols may each have a functionality of from about 2 to about 5, or from about 2 to about 4, or from about 2 to about 3.

Polyols can be produced by techniques known in the art. For example, suitable polyester polyols are produced from polycarboxylic acids and polyfunctional alcohols having from 2 to 12 carbon atoms. Examples of suitable polycarboxylic acids include glutaric acid, succinic acid, adipic acid, sebacic acid, phthalic acid, siophthalic acid and terephthalic acid. Examples of suitable polyfunctional alcohols include ethylene glycol, propylene glycol, propanediol, butane and hexane diol, and mixtures of polyfunctional alcohols.

Polyester polyols suitable for use may have a number average molecular weight of from about 100 g/mol to about 10,000 g/mol, from about 150 g/mol to about 5,000 g/mol, or from about 200 g/mol to about 1,500 g/mol. In various embodiments, suitable polyester polyols have a total hydroxyl value range from about 10 mg KOH/g to about 1000 mg KOH/g, from about 20 mg KOH/g to about 750 mg KOH/g, or from about 50 mg KOH/g to about 500 mg KOH/g. Suitable polyester polyols are available from The Dow Chemical Company (Midland, Mich.) under the trade name Bester™ polyester polyols. Suitable commercially available products of that type include Bester™ 20 polyester polyol, Bester™ 35 polyester polyol, Bester™ 41 polyester polyol, Bester™ 80 polyester polyol, Bester™ 100 polyester polyol, Bester™ 113 polyester polyol, Bester™ 176 polyester polyol, and Bester™ 190 polyester polyol. In various embodiments, polyester polyols may be employed in amounts of from about 0.1 wt % to about 10 wt %, from about 0.5 wt % to about 5 wt %, or from 0.75 wt % to about 3 wt % based on the polyurethane prepolymer.

Polyether polyols can be obtained conventionally by reacting alkylene oxides (such as ethylene, propylene or butylene oxide) with a polyol or polyhydroxy alcohol initiator. Examples of suitable initiators include ethylene glycol; diethylene glycol; propylene glycol; dipropylene glycol; tripropylene glycol; 1,4-butanediol; 1,6-hexane diol; sugar alcohols such as sucrose; cycloaliphatic diols such as 1,4-cyclohexane diol, glycerin, trimethanoyl propane and triethanolamine. Catalysts for the polymerization can be either anionic catalysts or cationic catalysts, with exemplary catalysts such as potassium hydroxide (KOH), boron trifluoride, or double cyanide complex catalysts such as zinc hexacyanocobaltate. In some embodiments, the polyether polyols are obtained using propylene oxide. The polyether polyols may have a hydroxyl value of 100-1000 mg KOH/g. For example, the polyether polyols may have hydroxyl values of between about 100 mg KOH/g and about 1,000 mg KOH/g, between about 100 mg KOH/g and about 750 KOH/g, or between about 105 mg KOH/g and about 700 mg KOH/g. As used herein, a hydroxyl number is the milligrams of potassium hydroxide equivalent to the hydroxyl content in one gram of the polyol or other hydroxyl compound. Polyether polyols suitable for use may have a number average molecular weight of from about 100 g/mol to about 10,000 g/mol, from about 150 g/mol to about 5,000 g/mol, or from about 200 g/mol to about 1,500 g/mol. Suitable commercially available polyether polyols include VORANOL™ CP 260, VORANOL™ CP 450, VORANOL™ CP 700 and VORANOL™ CP 1000, VORANOL™ 1010L and VORANOL™ P-400, available from The Dow Chemical Company (Midland, Mich.). Polyether polyols may be incorporated in amounts of from about 0.1 wt % to about 80 wt %, from about 0.5 to about 75 wt %, or from about 1 wt % to about 60 wt % based on the polyurethane prepolymer. In some embodiments, mixtures of polyether polyols may be employed. For example, in one embodiment a mixture of 56.7 wt % VORANOL™ 1010L and 1.03 wt % VORANOL™ CP 260 is used.

To form the polyurethane prepolymer, various embodiments are contemplated. In one such embodiment, the isocyanate(s) may be added to a reactor and heated to about 40° C. while being stirred. The isocyanate reactive component may be added dropwise to the reactor. The reaction temperature may be increased to up to about 80° C. and held at that temperature until the desired NCO % is reached. In other embodiments, other suitable methods for forming the polyurethane prepolymer may be used.

The resultant polyurethane prepolymer may be an isocyanate (NCO) terminated prepolymer with a weight percent of isocyanate monomeric content of less than or equal to about 1%, from about 0.001% to about 1% or from about 0.01% to about 1%. Additionally, in various embodiments, the polyurethane prepolymer has a viscosity of less than about 10,000 mPa*s, less than about 7,500 mPa*s, less than about 5,000 mPa*s, or less than about 4,000 mPa*s at 50° C. and is substantially free of monofunctional reactive components. Without being bound by theory, the inclusion of monofunctional reactive components lowers the weight percent of unreacted isocyanate groups (NCO %) and may decrease the viscosity or may increase the viscosity. However, a viscosity that is too high (e.g., above about 10,000 mPa*s at 50° C.) or too low may be difficult to mix with other components to form a homogeneous mixture, and the resultant foam may have one or more undesirable properties.

The polyurethane foam includes from about 40% to about 70% by weight of the polyurethane prepolymer. In addition to the polyurethane prepolymer, the polyurethane foam also includes at least a propellant and a catalyst. In some embodiments, the polyurethane foam may also include one or more other additives, such as flame retardants, plasticizers, surfactants, pigments, dye, fillers, or the like.

In various embodiments, the propellant may be selected based at least in part on the desired density of the final foam. Without being bound by theory, the propellant may absorb heat from the exothermic reaction of the combination of the isocyanate component with the isocyanate reacting mixture and vaporize and provide additional gas useful in expanding the polyurethane foam to a lower density. Suitable propellants can include those that have high vapor pressures to dissolve, froth, and propel the contents of the can or cylinder through the delivery system. In one or more embodiment, the propellant may include one or more hydrocarbons, such as cyclobutane or n-butane. The hydrocarbon may be, for example, one or more materials with a boiling point of from about −50° C. to about 30° C. or from about −50° C. to about 15° C. In one or more embodiments, the hydrocarbon may include a combination of isobutane and propane with ratios by weight of from about 50/50 to about 100/0, or from about 60/40 to about 90/10. Alternative propellant embodiments may include a hydrocarbon and dimethylether blend. Exemplary propellants may include a hydrocarbon to dimethylether blend with ratios by weight of from about 30/70 to about 90/10 by weight, or from about 50/50 to about 80/20. Although various embodiments include a hydrocarbon and dimethylether blend, propellants in addition to or as alternatives to, the hydrocarbon and dimethylether blend, may also be used. For example, these propellants may include hydrofluoroolefin (HFO) propellants such as HFO-1234ze (E) and HFO-1234yf, or hydrofluorocarbon (HFC) propellants such as HFC-134a, HFC-245fa, and HFC-152a. In various embodiments, the amount of propellant is from about 20 wt % to about 40 wt % of the polyurethane foam, or from about 25 wt % to about 35 wt % of the polyurethane foam.

Catalysts for promoting the reaction between the isocyanate(s) and the isocyanate reactive component may include amine catalysts, metal complexes, or combinations thereof. Such catalysts may additionally or alternatively promote the reaction between free isocyanate and atmospheric moisture such that the reaction between the isocyanate(s) and the isocyanate reactive component occurs when the components are dispensed from the can or cylinder. The catalyst, which may also be called blowing catalysts, may be present in an amount of from about 1 wt % to about 5 wt %, from about 1.5 wt % to about 4.5 wt %, or from about 2 wt % to about 4 wt % of the formulation used to produce the polyurethane foam.

Amine catalysts may include organic compounds that contain at least one tertiary nitrogen atom and are capable of catalyzing the hydroxyl/isocyanate reaction between the isocyanate component and the isocyanate reacting mixture. Amine catalysts can include, by way of example and not limitation, triethylenediamine, tetramethylethylenediamine, pentamethyldiethylene triamine, bis(2-dimethylaminoethyl) ether, triethylamine, tripropylamine, tributylamine, triamylamine, pyridine, quinoline, dimethylpiperazine, piperazine, N,N-dimethylcyclohexylamine, N-ethyl-morpholine, 2,2'-dimorpholinodiethylether ("DMDEE"), 2-methylpropanediamine, methyltriethylenediamine, 2,4,6-tri(dimethylamino methyl)phenol, N,N',N"-tris(dimethylamino-propyl) sym-hexahydrotriazine, and mixtures thereof. In further embodiments, the amine catalyst includes bis(2-dimethylamino-ethyl)ether, dimethylcyclohexylamine, N,N-dimethyl-ethanolamine, triethylenediamine, triethylamine, 2,4, 6-tri(dimethylaminomethyl)phenol, N,N',N-ethylmorpholine, and/or mixtures thereof.

Common metal complexes that may be used as metal catalysts may include organic and inorganic metal complexes and salts, such as, by way of example and not limitation, stannous chloride, stannous octoate, tin mercaptide, and dibutyltin dilaurate.

In various embodiments, fire performance may be enhanced by including one or more flame retardants. Without being bound by theory, flame retardants may inhibit, suppress, or delay the production of flames to prevent the spread of fire. Flame retardants may be reactive or non-reactive, or combinations of reactive and non-reactive components. Suitable flame retardants may be brominated or non-brominated and may include, by way of example and not limitation, tris(1,3-dichloropropyl)phosphate, tris(2-chloroethyl)phosphate, tris(2-chloropropyl)phosphate, diammonium phosphate, various halogenated aromatic compounds, antimony oxide, alumina trihydrate, polyvinyl chloride, and combinations thereof. Flame retardants may also include mineral flame retardants, such as borates, red phosphorous, organohalogen, and organophosphorous compounds such as triphenyl phosphate and paraffins. When used, the flame retardant may be present in an amount from about 10 wt % to about 40 wt % of the formulation used to produce the polyurethane foam, or from about 10 wt % to about 20 wt % of the formulation used to produce the polyurethane foam.

Surfactants, including organic surfactants and silicone-based surfactants, may be added to serve as cell stabilizers. As used herein, "cell stabilizers" are compounds employed to stabilize the foaming reaction mixture against collapse and the formation of large uneven cells until it cures. Various compositions are contemplated for the surfactants, including by way of example and not limitation, polydimethylsiloxane-polyoxyalkylene block copolymers, silicone oils, nonylphenol ethoxylates, organosilicones, and other organic compounds. When used, the surfactant may be present in an amount of from about 2 wt % to about 5 wt % of the formulation used to produce the polyurethane foam.

Plasticizers may be added to increase the plasticity or fluidity of the formulation. Plasticizers are generally non-reactive components, and may be based on esters of polycarboxylic acids or phthalates, benzoates, or carbonates. One suitable commercially available plasticizer is JEFFSOL® PC, a propylene carbonate plasticizer from Huntsman Corp. (Salt Lake City, Utah). When used, the plasticizer may be present in an amount of from about 5 wt % to about 40 wt %, from about 7 wt % to about 30 wt %, or from about 10 wt % to about 20 wt % of the formulation used to produce the polyurethane foam.

In various embodiments, the components of the polyurethane foam may be added to a pressurized vessel, such as a can or cylinder, and are mixed by shaking the vessel prior to dispensing. The polyurethane foam may be self-propelled through an applicator or dispensing accessory when dispensed onto a substrate. In particular, the components may be maintained under pressure until the opening of the pressurized container. When the pressurized container is opened, such as through a trigger associated with the applicator or dispensing accessory, the polyurethane foam is self-propelled from the vessel by the propellant. Upon release from the pressurized vessel, the propellant froths the formulation into foam while the components in the formulation react with atmospheric moisture to cure into a polyurethane foam.

EXAMPLES

The following examples are provided to illustrate various embodiments, but are not intended to limit the scope of the claims. All parts and percentages are by weight unless otherwise indicated.

A description of the raw materials used in the examples is as follows:

VORALUX™ HE1000 is a TDI biuret having a final NCO % of about 40% and an equivalent weight of approximately 105 g/mol, available from The Dow Chemical Company (Midland, Mich.);

VORANATE™ M595 is a PMDI (polymeric methylene diphenyl diisocyanate), available from The Dow Chemical Company (Midland, Mich.);

VORANOL™ 1010L is a polypropylene glycol with a hydroxyl value of approximately 110 mg KOH/g and a functionality of about 2, available from The Dow Chemical Company (Midland, Mich.);

Bester™ 176 is a polyester polyol with a hydroxyl value of approximately 315 mg KOH/g and a functionality of about 2, available from The Dow Chemical Company (Midland, Mich.);

VORANOL™ CP 260 is a polyether polyol which is an all propylene oxide polyol based on glycerin and propylene oxide, with a hydroxyl value of approximately 660 mg KOH/g and a functionality of about 3, available from The Dow Chemical Company (Midland, Mich.);

JEFFSOL® PC is a propylene carbonate, available from Huntsman Corp. (Salt Lake City, Utah);

VORANATE™ M229 is a PMDI (polymeric MDI) having an equivalent weight of 136 g/equivalent, available from The Dow Chemical Company (Midland, Mich.);

ISONATE™ T-80 is a monomeric TDI having a functionality of approximately 2, available from The Dow Chemical Company (Midland, Mich.);

ISONATE™ OP 50 is a 50% 4,4'-methylene diphenyl isocyanate, 50% 2,4'-methylene diphenyl isocyanate mixture having a functionality of 2.0 and an equivalent weight of 125 g/equivalent, available from The Dow Chemical Company (Midland, Mich.);

VORANOL™ P1010 is a polyether polyol, specifically a 1000 g/mol molecular weight polyoxypropylene diol, available from The Dow Chemical Company (Midland, Mich.); and VORANOL™ P400 is a polyether polyol, specifically a 400 g/mol molecular weight polyoxypropylene diol, available from The Dow Chemical Company (Midland, Mich.).

Table 1 below lists Comparative Examples 1-3 and Example 1, which is an exemplary embodiment of the present formulation. All numbers are represented in percent by weight of the polyurethane prepolymer.

Polyurethane prepolymers were prepared by adding the isocyanate components, the isocyanate reactive components, and the plasticizer to a reactor. All compositions were prepared according to the components provided in Table 1.

TABLE 1

| Polyurethane Prepolymers | | | | |
| --- | --- | --- | --- | --- |
| Materials | Example 1 | Comparative Example 1 | Comparative Example 2 | Comparative Example 3 |
| VORALUX ™ HE1000 | 20.62 | 0 | 0 | 0 |
| VORANATE ™ M595 | 10.31 | 0 | 0 | 0 |
| VORANOL ™ 1010L | 56.7 | 0 | 0 | 0 |
| Bester ™ 176 | 1.03 | 0 | 5.70 | 4.4 |
| VORANOL ™ CP 260 | 1.03 | 0 | 0 | 0.9 |
| JEFFSOL ® PC | 10.31 | 0 | 10 | 11.5 |
| VORANATE ™ M229 | 0 | 48.49 | 0 | 35.9 |
| ISONATE ™ T-80 | 0 | 0 | 45.56 | 0 |

TABLE 1-continued

Polyurethane Prepolymers

| Materials | Example 1 | Comparative Example 1 | Comparative Example 2 | Comparative Example 3 |
|---|---|---|---|---|
| ISONATE ™ OP-50 | 0 | 0 | 5.70 | 0 |
| VORANOL ™ P1010 | 0 | 25.8 | 0 | 47.3 |
| VORANOL ™ P400 | 0 | 11.8 | 0 | 0 |
| Glycerin | 0 | 0 | 4.55 | 0 |
| Castor oil | 0 | 0 | 28.49 | 0 |
| 2-ethyl hexanol | 0 | 13.91 | 0 | 0 |
| NCO % | 5.83 | 4.3 | 7 | 6 |
| Isocyanate monomer content, % | 1.1 | 0.44 | 1.9 | 3.5 |
| Viscosity at 50° C., mPa * s | 3,500 mPa * s | Quasi solid | 15,500 mPa * s | 33,800 mPa * s |

The NCO %, isocyanate monomer content, and viscosity of the resulting polyurethane prepolymer were measured. In particular, the NCO % was measured according to ASTM D1515. Isocyanate monomer content was measured using HPLC. Without being bound by theory, the results shown in Table 1 indicate that the NCO % and viscosity may be greatly influenced by the type of isocyanate present in the reaction. As shown in Table 1, the use of TDI biuret and PMDI resulted in a polyurethane prepolymer that had an NCO % of greater than 1% and a viscosity of below 5,000 mPa*s. Moreover, although the total isocyanate monomer content was just over 1%, the free isocyanate monomer content of each individual isocyanate was less than 1%. In particular, the MDI % was 0.16 and the TDI % was 0.94. Accordingly, Example 1 resulted in a polyurethane prepolymer that could be sold without being subject to many labeling requirements of various environmental, health, and safety organizations.

Referring to Comparative Example 1, PMDI (i.e., VORANATE™ M229) and a significant amount of reactive monofunctional alcohol (i.e., 2-ethyl hexanol) were used to reduce both the NCO % and the viscosity, and the resultant polyurethane prepolymer had an isocyanate monomer content of less than 1%. However, the polyurethane prepolymer was a quasi solid with a viscosity of greater than about 50,000 mPa*s at 50° C. The viscosity of this polyurethane prepolymer may make it unsuitable for various applications, including applications in which it is to be further mixed homogenously with other components.

In Comparative Example 2, a low functionality TDI (i.e., ISONATE™ T-80) and a low functionality MDI (i.e., ISONATE™ OP-50) were employed. However, the viscosity of the resultant polyurethane prepolymer was greater than 10,000 mPa*s at 50° C., even at a higher NCO %. The viscosity of this polyurethane prepolymer may make it unsuitable for various applications.

Comparative Example 3 employed a PMDI with a similar NCO content as Comparative Examples 1 and 2, but the resulting polyurethane prepolymer had an isocyanate monomer content of greater than 1% and a viscosity greater than 10,000 mPa*s at 50° C. Accordingly, the resultant polyurethane prepolymer may be difficult to mix with other components in the polyurethane foam.

It is further noted that terms like "preferably," "generally," "commonly," and "typically" are not utilized herein to limit the scope of the claimed invention or to imply that certain features are critical, essential, or even important to the structure or function of the claimed invention. Rather, these terms are merely intended to highlight alternative or additional features that may or may not be utilized in a particular embodiment of the present disclosure.

It will be apparent that modifications and variations are possible without departing from the scope of the disclosure defined in the appended claims. More specifically, although some aspects of the present disclosure are identified herein as preferred or particularly advantageous, it is contemplated that the present disclosure is not necessarily limited to these aspects.

The invention claimed is:

1. A polyurethane prepolymer composition comprising:
    an isocyanate component in an amount from about 10% to about 60% by weight based on the polyurethane prepolymer composition, the isocyanate component comprising a toluene diisocyanate biuret in an amount of from about 60% to about 80% by weight based on the isocyanate component and polymethylene polyphenyl isocyanate (PMDI); and
    an isocyanate reactive component in an amount of up to about 70% by weight based on the polyurethane prepolymer composition, the isocyanate reactive component comprising one or more polyester polyols and one or more polyether polyols; and
    wherein the polyurethane prepolymer composition has a viscosity of less than about 10,000 mPa*s at 50° C., is substantially free of monofunctional reactive components, has a free isocyanate monomer content of the PMDI of less than about 1% by weight, and has a free isocyanate monomer content of the toluene diisocyanate biuret of less than about 1% by weight.

2. The polyurethane prepolymer composition according to claim 1, wherein the isocyanate reactive component is present in an amount of from about 30% to about 70% by weight based on the polyurethane prepolymer composition.

3. A polyurethane foam prepared from a formulation comprising:
    (a) from about 40% to about 70% by weight of a polyurethane prepolymer composition based on the total weight of the formulation, the polyurethane prepolymer composition comprising:
        an isocyanate component in an amount of up to about 70% by weight based on the polyurethane prepolymer composition, the isocyanate component comprising a toluene diisocyanate biuret in an amount of from about 60% to about 80% by weight based on the isocyanate component and polymethylene polyphenyl isocyanate (PMDI); and an isocyanate reactive component in an amount of up to about 70% by weight based on the polyurethane prepolymer composition, the isocyanate reactive component comprising one or more polyester polyols and one or more polyether polyols;

(b) from about 20% to about 40% by weight of a propellant, based on the total weight of the formulation; and (c) from about 1% to about 5% by weight of a catalyst, based on the total weight of the formulation;

wherein the polyurethane prepolymer composition has a viscosity of less than about 10,000 mPa*s at 50° C., is substantially free of monofunctional reactive components, has a free isocyanate monomer content of the PMDI of less than about 1% by weight, and has a free isocyanate monomer content of the toluene diisocyanate biuret of less than about 1% by weight.

4. The polyurethane foam according to claim 3, the formulation further comprising from about 10% to about 40% by weight of a flame retardant.

5. The polyurethane foam according to claim 3, the isocyanate component further comprising at least one additional isocyanate, wherein a free isocyanate monomer content of each additional isocyanate is less than about 1% by weight.

6. The polyurethane foam according to claim 3, wherein the isocyanate reactive component is present in an amount of from about 30% to about 70% by weight based on the polyurethane prepolymer composition.

7. The polyurethane foam according to claim 3, the formulation further comprising from about 2% to about 5% by weight of a stabilizer.

8. The polyurethane foam according to claim 3, the formulation further comprising from about 10% to about 40% by weight of a plasticizer.

* * * * *